Oct. 17, 1950 D. C. BEATTY 2,525,763
APPARATUS FOR DELIVERING AND RECEIVING TELEPHONE MESSAGES
Filed July 23, 1948
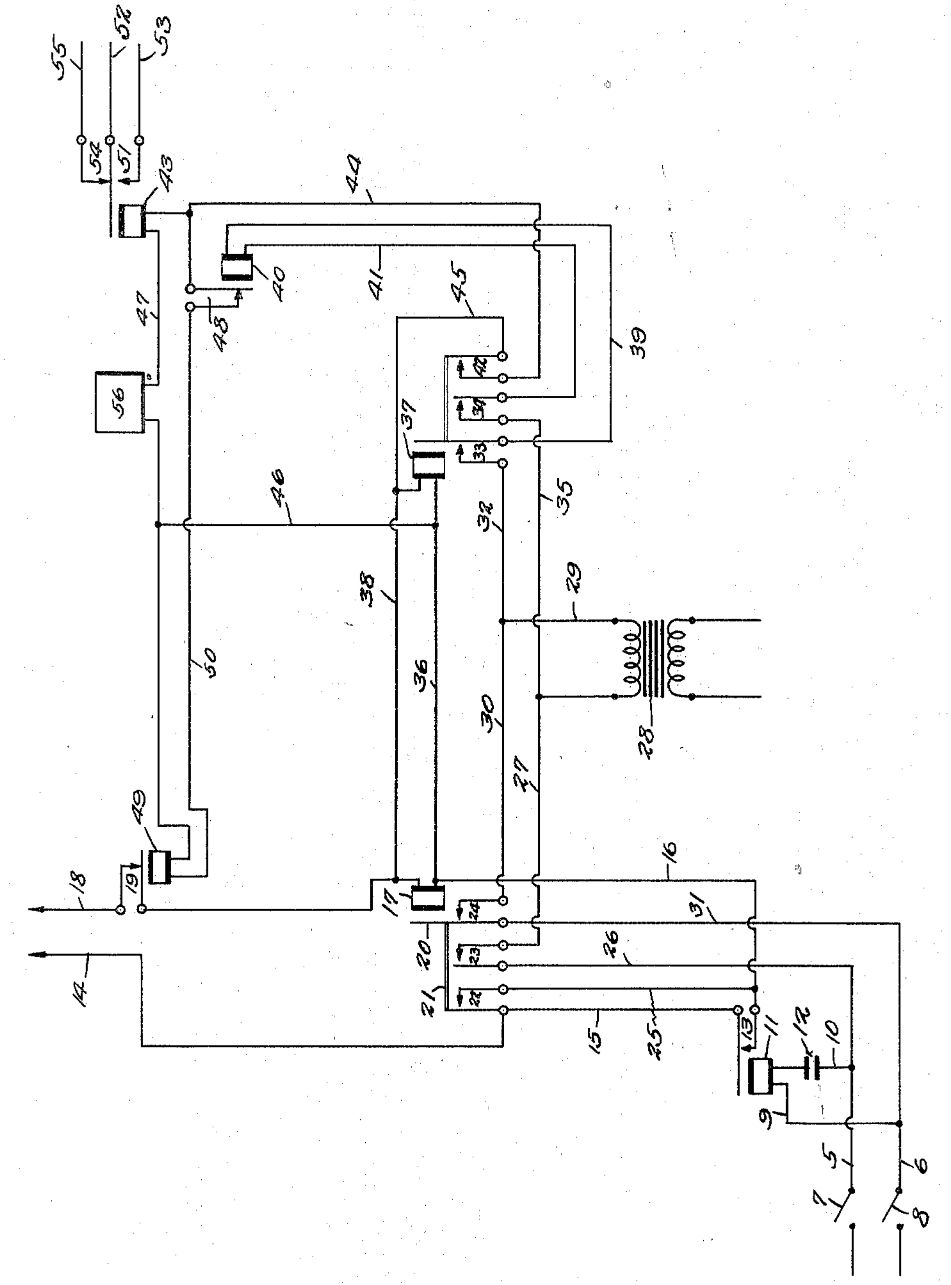
D. C. Beatty
INVENTOR
BY C. A. Snow & Co.
ATTORNEYS.

Patented Oct. 17, 1950

2,525,763

UNITED STATES PATENT OFFICE 2,525,763

APPARATUS FOR DELIVERING AND RECEIVING TELEPHONE MESSAGES

Donald C. Beatty, Birmingham, Ala.

Application July 23, 1948, Serial No. 40,248

7 Claims. (Cl. 179—6)

This invention relates to electrical apparatus for delivering a message to a party calling an unattended telephone, and for receiving, after such message has been delivered, any message which the calling party may desire to lease.

By way of background, it may be noted that the desirability of apparatus of the character mentioned is readily apparent as being in the interest not only of the general public, but also of telephone companies and the manufacturers of recording devices. So far as the general public is concerned, such apparatus fills a long felt need in connection with the conducting of one's personal and business affairs. This is so because when one calls an unattended telephone, he is at a loss to know when and where to call again for the purpose of reaching the called party. The called party, in turn, may be similarly inconvenienced, by the inability of the party to make contact for the transmission of information.

So far as telephone companies are concerned, it is a current and serious problem that the parties are unable to make contact by reason of a called telephone being found to be unattended. Where a long distance call is being made, the necessity of closing through circuits through a number of cities at periodic intervals, to complete a single call, arises with the result that the lines are tied up to a serious extent. The same is true, to a lesser but still serious extent, with respect to local calls.

So far as recording manufacturers are concerned, apparatus of the type described is a distinct and clearly desirable extension of the use to which recording machines can be put.

It is, accordingly, the main object of the present invention to provide apparatus which will be capable of eliminating the current difficulty above.

Other important objects are to provide apparatus as stated that will be simple and compact; will be attachable to a conventionally installed telephone; will be capable of installation with a minimum expenditure of time and effort; will offer no problems in the use thereof by the parties; and will be fully automatic in operation, in delivering and receiving a message.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing, the single figure is a schematic view of apparatus constructed in accordance with the invention.

Referring to the drawing in detail, 5 and 6 are leads connected directly to the ordinary telephone circuit including a telephone, not shown, and its signal device, also not shown.

When the telephone is attended, manually operated switches 7 and 8 are left open. During these periods, the device is accordingly out of use, and ordinary use of the telephone is made. When, however, the instrument is to be left unattended, switches 7 and 8 are manually closed, and when calls are made to the unattended instrument, the apparatus will operate in a manner to be described.

Extending respectively from the leads 5 and 6 are the leads 9 and 10, that are connected to the relay 11, lead 10 having the condenser 12.

Through the ordinary telephone circuit referred to above, there is adapted to pass a "sustaining" current, as for example, during ordinary conversation between a calling and a called party.

On the other occasions, a current differing from the "sustaining" current referred to above, is caused, automatically or otherwise, to pass through the circuit to which leads 5 and 6 are electrically connected, for the purpose of causing actuation of a signal device such as a bell. This can be termed an "intermittent" current, and is exemplified by the sending of surges at intervals through the telephone circuit for the purpose of ringing the bell.

Assuming that the switches 7 and 8 are in "on" position, the "intermittent" current will not only actuate the signaling device, but also, will energize starting relay 11.

This will close the normally open starting switch contacts 13, so as to close a circuit including lead 14 extending from any local source of electric power, not shown, such as the ordinary house supply, lead 15, lead 16, holding relay 17, and lead 18 connected to the other side of said house circuit. Lead 18 includes the normally closed turn-off switch contacts 19.

As a result, relay 17 is energized and attracts the arm 20, that carries the non-conductive bar 21. This closes switch contacts 22, 23, 24.

The closing of switch contacts 22, as will be observed, throws a short across the switch contacts 13. Therefore, there will be closed a power circuit including lead 14, switch contacts 22, and leads 25, 16, and 18. The result will be to hold relay 17 energized, without possibility of its being affected by opening and closing of switch contacts 13 under the action of the intermittent current referred to.

The closing of switch contacts 23 electrically connects one field winding of a coupling transformer to and across the leads 5 and 6. This connection may be observed as including lead 5, lead 26, switch contacts 23, lead 27, one field winding of the coupling transformer 28, lead 29, lead 30, switch contacts 24, lead 31, and lead 6.

The making of this electrical connection brings about the operation of devices, not shown, that result in the cessation of the intermittent current referred to in the telephone circuit to which leads 5 and 6 are connected. The actuation of these devices likewise results in the stabilization of the "sustaining" current in said telephone circuit and in the leads 5 and 6. The stabilized conditions of said circuit will persist until it is interrupted either manually, such as by changing the circuit characteristic, by hanging up the receiver of a telephone connected in said circuit, or automatically.

When the circuit including the relay 17 was first closed, electrical current, it will be observed, will have passed through lead 36, delayed action relay 37, and lead 38. The relay 37 is of a type, well-known in the art, that is adapted to operate after a delay following the completion of an electric circuit through its field winding.

When, after such delay, relay 37 is energized, it operates to close switch contacts 33, 34. One side of each of these contacts will have previously been electrically connected to leads 5 and 6 at the time leads 5 and 6 were brought into electrical connection with one field winding of the coupling transformer 28. The electrical connection last referred to is through the medium of leads 32 and 35 respectively.

From the other side of switch contacts 33 extends lead 39, extending to turn-off relay 40, and from the other side of switch contacts 34 extends lead 41, also extending to said relay 40. Accordingly, on the closing of switch contacts 33, 34, there will be energized the relay 40. This will be energized by the "sustaining" current referred to. As a result, normally closed switch contacts 48 are opened.

Switch contacts 42 are also closed by energizing of the relay 37, but are adapted to close after the closing of the contacts 33, 34. The closing of the contacts 42 cause a relay 43 to be energized. This is by reason of the fact that there is a lead 44 extending from one side of switch contact 42 to relay 43. There is also a lead 45 extending from the other side of the switch contact 42, to the lead 38. Tracing the secondary circuit closed by closing of the contact 42, it may be observed that the path is through leads 14, 25, 16, 36, 46, 47, 44, 45, 38, and 18.

Upon the interruption, changing of polarity, or any similar change in the referred to "sustaining" current in circuit to and with leads 5 and 6, through the field winding of the relay 40, the relay 40 will be deenergized, thus releasing switch contacts 48, which return to closed position. Accordingly, a turn-off circuit is closed to relay 49, by reason of its electrical connection through lead 47 to the relay 43, and through lead 50 to the lead 44.

Energizing of the relay 49 causes switch contact 19 to open. The electrical circuit between the house supply and relays 17, 37, 43, and 49 is thus broken, and relay 17 reverts to its normal condition, with contacts 22, 23, and 24 returning to open position.

Switch contacts controlled by relays 37, 43, and 49 are thus permitted to return to their normal position, with contacts 33, 34, and 42 open, contacts 48 closed, and contacts 19 also closed.

In this connection, it may be noted that there are switch contacts 51, that are normally open, but which are closed when the relay 43 is energized. These will accordingly have been closed on energization of said relay 43, closing a circuit including the leads 52 and 53 of a recording device, not shown. Therefore, when relay 43 is deenergized as stated above, switch contacts 51 will open, and switch contacts 54, that are normally closed, will be closed. Contacts 54 are respectively connected to leads 52 and 55 of said recording device.

With respect to the recording device used with the apparatus, this may be any conventional device of this type. It may be of the cylinder, disc, or wire type, to state a few main examples. Modification of such a device for use with my apparatus is kept to a minimum, and since such modification is well within the skill of those in the art, only a brief discussion of the recording device is necessary.

Both the input and output sides of the recording device should be electrically connected to the other field winding of the coupling transformer 28, shown as the lower winding in the figure. Impressions made on the device by the party who leaves the phone unattended, to provide a message which will be delivered to a calling party, will be made on one cylinder, disc, or wire, to which extend leads 52 and 53. Impressions made by the calling party, to leave a message, are made on another cylinder, disc, or wire, to which extend leads 52 and 55. Switch contacts 51 and 54, respectively associated with these pairs of leads, control separate and independent circuits neither of which, as will be understood, can be closed at one and the same time.

There will be no possibility of a second calling party hearing a message left by a first calling party. This possibility is readily eliminated as follows. When the "message delivery" record is run off to deliver a message to a calling party, at the termination of the message the movement of the record mechanically actuates a switch 56, setting into operation a reversing mechanism that returns said record to its starting point concurrently with the closing of the switch contacts 54. The record controlled by switch contacts 54, adapted to receive the calling parties message, does not have such a reversing mechanism. In other words, after the calling party makes an impression on said record, an impression made by a second calling party will be begun at the point of termination of the first received message.

The operation of the device in actual use may now be noted. The party leaving the phone unattended first records a record so as to provide a message to be delivered. This is accomplished in the usual manner of recording messages with the particular voice recorder, or, through the simple expedient of lifting the instrument from its hook, with switches 7 and 8 in "on" position and switch 56 also in "on" position. By manually closing switch 13 momentarily and dialing any number, that is any digit, for example from "1" to "9," the chain of electrical sequences described hereinbefore is set into motion, and on closing of switch contacts 51, the person can record the message to be delivered subsequently to calling parties. The spool, reel, disc or other article containing or carrying this recorded message is then properly placed within the voice recorder machine so that the message will be played back to parties calling the unattended telephone as noted below.

Subsequently, and with these switches still in "on" position, a call to the unattended instrument made by any party will again set into motion said sequences. First, when the bell is rung, switch contacts 22, 23, and 24 will be closed. After a short interval, say five seconds, contacts 33 and 34 will be closed. This will result in the opening of contacts 48. Immediately after, contacts 42 close, and this causes the closing of contacts 51, whereupon the recorded message will be delivered to the calling party. As the message ends, switch 56 is mechanically tripped, so that now switch contacts 54 will be closed. The calling party is now enabled to deliver and record his message.

The hanging up of the calling parties instrument causes an interruption or similar change in the "sustaining" current, and this change in the current through field winding of relay 40 deenergizes said relay, closing the contacts 48. The closing of contacts 48 closes a circuit from the house supply (leads 14 and 18 extending therefrom) to the relay 49, which opens the switch contacts 19. With the opening of these contacts the electrical circuit including the relay 17, relay 49, relay 37, and relay 43, is broken instantaneously, and thus switch contacts 22, 23, and 24 will open, 33, 34, and 42 will open, switch contacts 48 will be closed, contacts 19 will be closed, contacts 54 will be closed, and 51 will be open. Thus the illustrated circuits are returned to their original or starting condition. A subsequent call will, with the switches 7, 8, and 56 in "on" position again set into motion the electrical sequences described.

What is claimed is:

1. Electrical apparatus for receiving and delivering telephone messages comprising a starting switch; means connected conductively to a telephone circuit for closing said switch momentarily responsive to ringing current impressed on said circuit; a power circuit including and momentarily closed by said switch; a holding relay in the power circuit and holding the power circuit closed, after opening of said switch; a secondary circuit, closed by said relay; recorder input and output circuits connected to the telephone circuit by said relay; means in the secondary circuit for closing the recorder output and input circuits in turn for successive delivery and recording messages; a normally closed turn-off switch in the power circuit; and means connected conductively to the telephone circuit for opening the turn-off switch responsive to interruption of current in the telephone circuit.

2. Electrical apparatus for receiving and delivering telephone messages comprising a starting switch; means connected conductively to a telephone circuit for closing said switch momentarily responsive to ringing current impressed on said circuit, a power circuit including and momentarily closed by said switch; a holding relay in the power circuit; a coupling transformer; a set of switches closed by the holding relay one of which by-passes the starting switch to hold the power circuit closed, the remaining switches of said set connecting one field winding of the transformer to the telephone circuit; a secondary circuit closed by said relay; recorder input and output circuits connected to the other field winding of the transformer; means in the secondary circuit for closing the recorder output and input circuits in turn for successive delivery and recording messages; a normally closed turn-off switch in the power circuit; and means connected conductively to the telephone circuit for opening the turn-off switch responsive to interruption of current in the telephone circuit.

3. Electrical apparatus for receiving and delivering telephone messages comprising a starting switch; a starting relay connected conductively to a telephone circuit for energization by intermittent ringing current impressed on said circuit to close said switch momentarily; a power circuit including and momentarily closed by said switch; a holding relay in the power circuit; a coupling transformer; a set of switches closed by the holding relay one of which by-passes the starter switch to hold the power circuit closed and the rest of which connect one field winding of the transformer conductively to the telephone circuit; a secondary circuit closed by the holding relay; a delayed action relay in the secondary circuit; a set of switches closed by the delayed action relay; recorder input and output circuits connected to the other field winding of the transformer; means operable by closing of one of the second-named set of switches for closing the output and input circuits in turn, for successive delivering and receipt of messages; a turn-off control relay connected conductively to the telephone circuit by closing of the remaining switches of the second set; and a normally closed turn-off switch in the power circuit controlled by the turn-off relay in a manner to be opened by deenergization of the turn-off relay responsive to a change of current characteristics in the telephone circuit.

4. Electrical apparatus for receiving and delivering telephone messages comprising a power circuit including a source of electricity; means connected conductively to a telephone circuit and adapted to cause the power circuit to be closed momentarily responsive to intermittent ringing current impressed on the telephone circuit; means for holding the power circuit closed; a secondary circuit; means in the power circuit for closing the secondary circuit; a delayed action relay in the secondary circuit; a set of switches closed by the delayed action relay; recorder input and output circuits, connected to the telephone circuit; means operable by closing of one of the switches of said set for closing the output and input circuits in turn for delivery and receipt of messages; a turn-off control relay connected conductively to the telephone circuit by the remaining switches of said set; and a normally closed turn-off switch in the power circuit controlled by the turn-off relay in a manner to be opened by deenergization of the turn-off relay responsive to a change of current characteristics in the telephone circuit.

5. Electrical apparatus for delivering and receiving telephone messages comprising a power circuit; means operable responsive to signal surges sent through a telephone circuit to close and hold closed said power circuit; a secondary circuit; means in the power circuit for closing the secondary circuit; a delayed action relay in the secondary circuit; a set of switches closed by the delayed action relay; recorder input and output circuits, connected to the telephone circuits;

means operable by closing of one of the switches of said set for closing the output and input circuits in turn for delivery and receipt of messages; a turn-off control relay connected conductively to the telephone circuit by the remaining switches of said set; and a normally closed turn-off switch in the power circuit controlled by the turn-off relay in a manner to be opened by deenergization of the turn-off relay responsive to a change of current characteristics in the telephone circuit.

6. Electrical apparatus for delivering and receiving telephone messages comprising a power circuit; means operable responsive to signal surges sent through a telephone circuit to close said power circuit; a holding relay in the power circuit; a coupling transformer; a set of switches closed by the relay one of which by-passes said means to hold the power circuit closed and the rest of which connect one field winding conductively to the telephone circuit; a secondary circuit closed by the holding relay; a delayed action relay in the secondary circuit; a set of switches closed by the delayed action relay; recorder input and output circuits connected to the other field winding of the transformer; means operable by closing of one of the second-named set of switches for closing the output and input circuits, in turn, for successive delivering and receipt of messages; a turn-off control relay connected conductively to the telephone circuit by closing of the remaining switches of the second set; and a normally closed turn-off switch in the power circuit controlled by the turn-off relay in a manner to be opened by deenergization of the turn-off relay responsive to a change of current characteristics in the telephone circuit.

7. Electrical apparatus for receiving and delivering telephone messages comprising a starting switch; a starting relay connected conductively to a telephone circuit for energization by intermittent ringing current impressed on said circuit to close said switch momentarily; a power circuit including and momentarily closed by said switch; a holding relay in the power circuit; a coupling transformer; a set of switches closed by the holding relay one of which by-passes the starter switch to hold the power circuit closed and the rest of which connect one field winding of the transformer conductively to the telephone circuit; a secondary circuit closed by the holding relay; a delayed action relay in the secondary circuit; a set of switches closed by the delayed action relay; recorder input and output circuits connected to the other field winding of the transformer; means operable by closing of one of the second-named set of switches for closing the output and input circuits in turn, for successive delivering and receipt of messages; a turn-off control relay connected conductively to the telephone circuit by closing of the remaining switches of the second set; a normally open turn-off circuit including switch contacts closed by deenergization of turn-off relay; a relay in the turn-off circuit; and a normally closed switch in the power circuit opened by energizing of the last-named relay, the turn-off relay being deenergized by a change in current characteristics of the telephone circuit.

DONALD C. BEATTY.

REFERENCES CITED

The following references are of record in the file of this patent:

UNITED STATES PATENTS

| Number | Name | Date |
|---|---|---|
| 2,005,788 | Keiser | June 25, 1935 |
| 2,261,420 | Shively et al. | Nov. 4, 1941 |